(12) United States Patent
Challagolla et al.

(10) Patent No.: US 11,755,319 B2
(45) Date of Patent: *Sep. 12, 2023

(54) CODE DEVELOPMENT MANAGEMENT SYSTEM

(71) Applicant: The Travelers Indemnity Company, Hartford, CT (US)

(72) Inventors: Venu Challagolla, Avon, CT (US); Mark R. Finn, Bristol, CT (US); Gai Sai Kiran Paladugu, Manchester, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,551

(22) Filed: Jan. 3, 2023

(65) Prior Publication Data

US 2023/0148374 A1    May 11, 2023

Related U.S. Application Data

(63) Continuation of application No. 15/973,741, filed on May 8, 2018, now Pat. No. 11,550,570.

(51) Int. Cl.
*G06F 9/44* (2018.01)
*G06F 8/77* (2018.01)
*G06F 11/36* (2006.01)

(52) U.S. Cl.
CPC ............ *G06F 8/77* (2013.01); *G06F 11/3612* (2013.01); *G06F 11/3616* (2013.01)

(58) Field of Classification Search
None
See application file for complete search history.

(56) References Cited

U.S. PATENT DOCUMENTS

| 8,302,079 B2 | 10/2012 | Bansal |
| 9,038,030 B2 * | 5/2015 | Rama .................... G06F 11/008 717/124 |

(Continued)

OTHER PUBLICATIONS

Yansong Wu et al., "The influence of developer quality on software fault-proneness prediction", 2014 (Year: 2014).*

(Continued)

*Primary Examiner* — Wei Y Zhen
*Assistant Examiner* — Lanny N Ung
(74) *Attorney, Agent, or Firm* — CANTOR COLBURN LLP

(57) ABSTRACT

A method includes collecting code development data associated with development of code files on a per user basis. A predicted code execution performance score is determined based on weighting one or more developer attributes captured in the code development data on the per user basis, the predicted code execution performance score indicative of a predicted likelihood of a code quality issue, where the one or more developer attributes are based at least in part on personnel data including a level of developer experience and a history of observed development activities of an associated developer from review data. One or more resources of one or more code execution servers associated with execution of selected files are predictively allocated based on the predicted code execution performance score. One or more code execution metrics are captured associated with executing selected files on the one or more code execution servers.

30 Claims, 12 Drawing Sheets

(56) References Cited

U.S. PATENT DOCUMENTS

| | | | |
|---|---|---|---|
| 9,229,902 B1 | 1/2016 | Leis et al. | |
| 9,449,042 B1 | 9/2016 | Evans et al. | |
| 9,619,363 B1 * | 4/2017 | Chitale | G06F 11/3692 |
| 9,785,432 B1 | 10/2017 | Wright | |
| 2009/0070734 A1 | 3/2009 | Dixon et al. | |
| 2011/0055798 A1 | 3/2011 | Kraft et al. | |
| 2011/0276354 A1 * | 11/2011 | Bijani | G06F 8/20 |
| | | | 705/7.11 |
| 2014/0047095 A1 | 2/2014 | Breternitz et al. | |
| 2016/0179503 A1 | 6/2016 | Bates et al. | |
| 2017/0068608 A1 | 3/2017 | Covell et al. | |
| 2017/0286516 A1 | 10/2017 | Horowitz et al. | |

OTHER PUBLICATIONS

Jon Eyolfson et al., "Do Time of Day and Developer Experience Affect Commit Bugginess?", 2011 (Year: 2011).*

Burak Turhan, "Weighted Static Code Attributes for Software Defect Prediction," 2008, pp. 143-148 (Year: 2008).

Sebastian Muller et al., "Using (Bio) Metrics to Predict Code Quality Online", 2016, IEEE International Conference on Software Engineering, pp. 452-463 (Year: 2016).

Taek Lee et al., "Developer Micro Interaction Metrics for Software Defect Prediction," Nov. 2016, IEEE Transactions of Software Engineering, vol. 42, No. 11, pp. 1015-1035 (Year: 2016).

* cited by examiner

CODE DEVELOPMENT MANAGEMENT SYSTEM

CROSS-REFERENCE TO RELATED APPLICATIONS

This is a continuation of U.S. application Ser. No. 15/973,741, filed May 8, 2018, the disclosure of which is incorporated herein by reference in its entirety.

BACKGROUND

In the process of developing executable code, multiple systems can be involved. For example, systems used for code development can differ from systems of a target platform upon which the code is intended to execute. Development tools can establish a simulation and test environment to test some aspects of code under development. However, issues related to execution on the target platform may not be fully apparent in the simulation and test environment used during development. For instance, issues related to resource management of the target platform, interactions with other applications and systems, and changes in operating environment can be difficult to accurately simulate in the simulation and test environment used during development. If code that is inefficient or has errors is allowed to execute on the target platform, problems can propagate beyond the newly developed and deployed code, for example, by reducing resources available to existing applications previously deployed on the target platform.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

DETAILED DESCRIPTION

Figure 1:
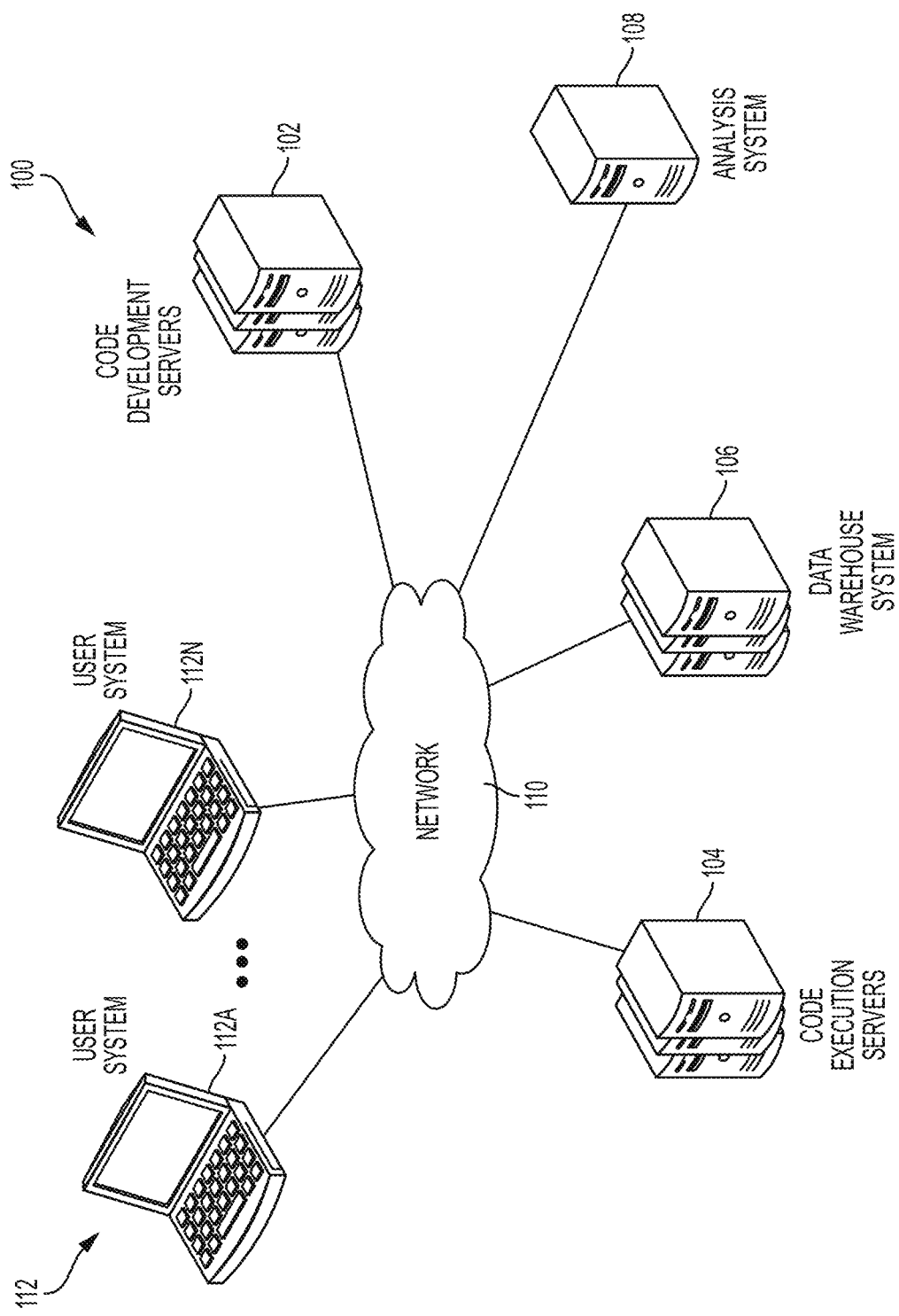
FIG. 1 depicts a block diagram of a system according to some embodiments of the present invention.

According to an embodiment, a system for code development management is provided. The system can improve computer system performance by collecting a plurality of code development data associated with development of code files on a per user basis. A predicted code execution performance score can be determined that is indicative of a predicted likelihood of a code quality issue in one or more selected files prior to allowing execution of the files on one or more code execution servers. One or more resources of the one or more code execution servers associated with execution of the one or more selected files can be predictively allocated based on the predicted code execution performance score. One or more code execution metrics associated with executing the one or more selected files on the one or more code execution servers can be captured to monitor performance and adjust subsequent computation of predicted code execution performance scores. Various factors can be used in determining the predicted code execution performance score, such as past execution or development issues associated with the code developer, an entity/organization of the code developer, a complexity assessment of the code, utilization status of the resources of the code execution servers, and other such factors as further described herein. Predictive allocation of resources can include lowering a maximum amount of resources available for code execution to limit excessive resource consumption. For example, an unconstrained execution of code on the code execution servers may allow for resource requests up to a maximum level of processing and memory system resources available with the expectation that the code under execution will complete faster and release the resources upon completion. The predicted code execution performance score can be used to limit or otherwise constrain the maximum level of processing and/or memory resources available for use during execution of one or more selected code files, e.g., 20% limit, 40% limit, 50% limit, etc. Further, the predicted code execution performance score may change or limit scheduling of execution of the one or more selected files until system resource utilization is predicted to be below a threshold limit. For instance, by monitoring resource utilization trends, it may be determined that a particular time of day, such as 2-4 AM, has a reduced utilization, and the predictive allocation of resources for the one or more selected files can be scheduled for such a time as to reduce the risk of adverse effects should the selected code files be inefficient or result in error conditions upon execution on the code execution servers. Thus, embodiments improve computer system performance by enhancing execution efficiency and reducing risks of adverse effects through predictive allocation of resources of code execution servers.

Embodiments can also gauge the overall productivity, effectiveness, and contributions of individual code developers and code development entities objectively. Metrics such as code complexity, code quality, resources consumption during execution, and other such indicators can be used to establish developer profiles. The developer profiles can be used in determining the predicted code execution performance score for code on a per-developer or development team basis. In addition to using the data in computing a predicted code execution performance score, the developer profiles can assist in assignment of tasks, identifying training gaps, and identifying technology areas having a lower or higher level of performance in terms of error rate, consistency, and the like. Correlations identified in collected data can be used to improve the accuracy of predicted code execution performance scores and predictive resource allocation adjustments. For example, as performance of individual developers improves as observed in reduced errors, restrictions placed on predictive resource allocation may be eased. By identifying more error prone developers or development entities using development data prior to deployment, the risk of an adverse impact on a target execution environment may be preemptively mitigated while still allowing the code to run and metrics to be collected from the target execution environment (e.g., actual results from code execution servers rather than from a simulated environment on the code development servers).

Turning now to FIG. 1, a system 100 is depicted upon which code development management may be implemented. The system 100 includes a plurality of server systems, such as one or more code development servers 102, one or more code execution servers 104, a data warehouse system 106, and an analysis system 108 coupled to a network 110. A plurality of user systems 112 can access content and/or interfaces through the network 110. For example, user system 112A may be configured as a developer system operable to interface with the code development servers 102, while user system 112N may be configured as an administrative system operable to interface directly with the analysis system 108 and access other elements of the system 100 indirectly, such as the code development servers 102, code execution servers 104, and data warehouse system 106.

In the example of FIG. 1, the code development servers 102 are operable to develop code files for subsequent execution on the code execution servers 104. Various records associated with code development and execution can be collected and stored in the data warehouse system 106. The analysis system 108 can use data gathered from the code development servers 102, code execution servers 104, and/or data warehouse system 106 to determine a predicted code execution performance score of one or more code files selected for execution and predictively allocate one or more resources of the one or more code execution servers 104 associated with execution of the one or more selected files based on the predicted code execution performance score. The predictive allocation can establish various limits such as: adjusting one or more of a scheduled start time, an execution priority, setting a maximum processing resource threshold, setting a maximum network resource threshold, setting a maximum memory usage threshold, and setting a maximum execution time threshold.

In the example of FIG. 1, each of the code development servers 102, code execution servers 104, data warehouse system 106, analysis system 108, and user systems 112 can include a processor (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100, such as elements of the code development servers 102, code execution servers 104, data warehouse system 106, analysis system 108, and/or user systems 112. Although depicted separately, one or more of the code development servers 102, code execution servers 104, data warehouse system 106, analysis system 108, and/or user systems 112 can be combined or further subdivided.

The user systems 112 may each be implemented using a computer executing one or more computer programs for carrying out processes described herein. In one embodiment, the user systems 112 may each be a personal computer (e.g., a laptop, desktop, etc.), a network server-attached terminal (e.g., a thin client operating within a network), or a portable device (e.g., a tablet computer, personal digital assistant, smart phone, etc.). In an embodiment, the user systems 112 are operated by users having the role of a software developer or a non-developer (e.g., a manager or administrator) with respect to a code development process, and the role designations may change over time.

Each of the code development servers 102, code execution servers 104, data warehouse system 106, analysis system 108, and user systems 112 can include a local data storage device, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein.

The network 110 can include any type of computer communication technology within the system 100 and can extend beyond the system 100 as depicted. Examples include a wide area network (WAN), a local area network (LAN), a global network (e.g., Internet), a virtual private network (VPN), and an intranet. Communication within the network 110 may be implemented using a wired network, an optical network, a wireless network and/or any kind of physical network implementation known in the art. The network 110 can be further subdivided into multiple sub-networks that may provide different levels of accessibility or prevent access to some elements of the system 100. For example, user systems 112 of developers may not have access to the data warehouse system 106 and/or the analysis system 108.

Figure 2:
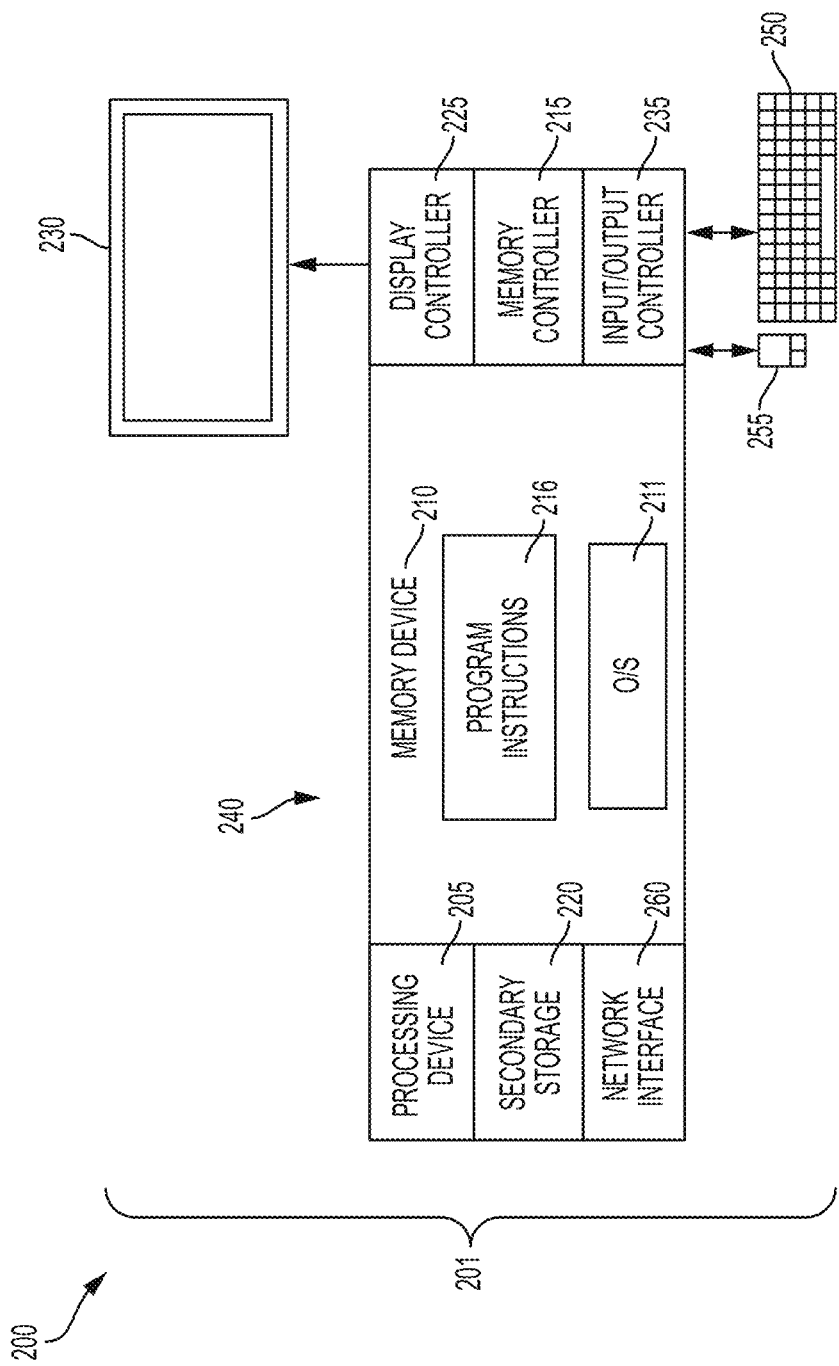
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the code development servers 102, code execution servers 104, data warehouse system 106, analysis system 108, and/or user systems 112 of FIG. 1.

In an exemplary embodiment, in terms of hardware architecture, as shown in FIG. 2, the computer 201 includes a processing device 205 and a memory device 210 coupled to a memory controller 215 and an input/output controller 235. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), or the like, etc.). Secondary storage 220 can include any one or combination of tape, compact disk read only memory (CD-ROM), flash drive, disk, hard disk drive, diskette, cartridge, cassette or the like, etc. Moreover, the memory device 210 and/or secondary storage 220 may incorporate electronic, magnetic, optical, and/or other types of storage media. Accordingly, the memory device 210 and/or secondary storage 220 are examples of a tangible computer readable storage medium 240 upon which instructions executable by the processing device 205 may be embodied as a computer program product. The memory device 210 and/or secondary storage 220 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (OS) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the processes as further described herein.

The computer 201 of FIG. 2 also includes a network interface 260 that can establish communication channels with one or more other computer systems via one or more network links of the network 110 of FIG. 1. The network interface 260 can support wired and/or wireless communication protocols known in the art.

Figure 3:
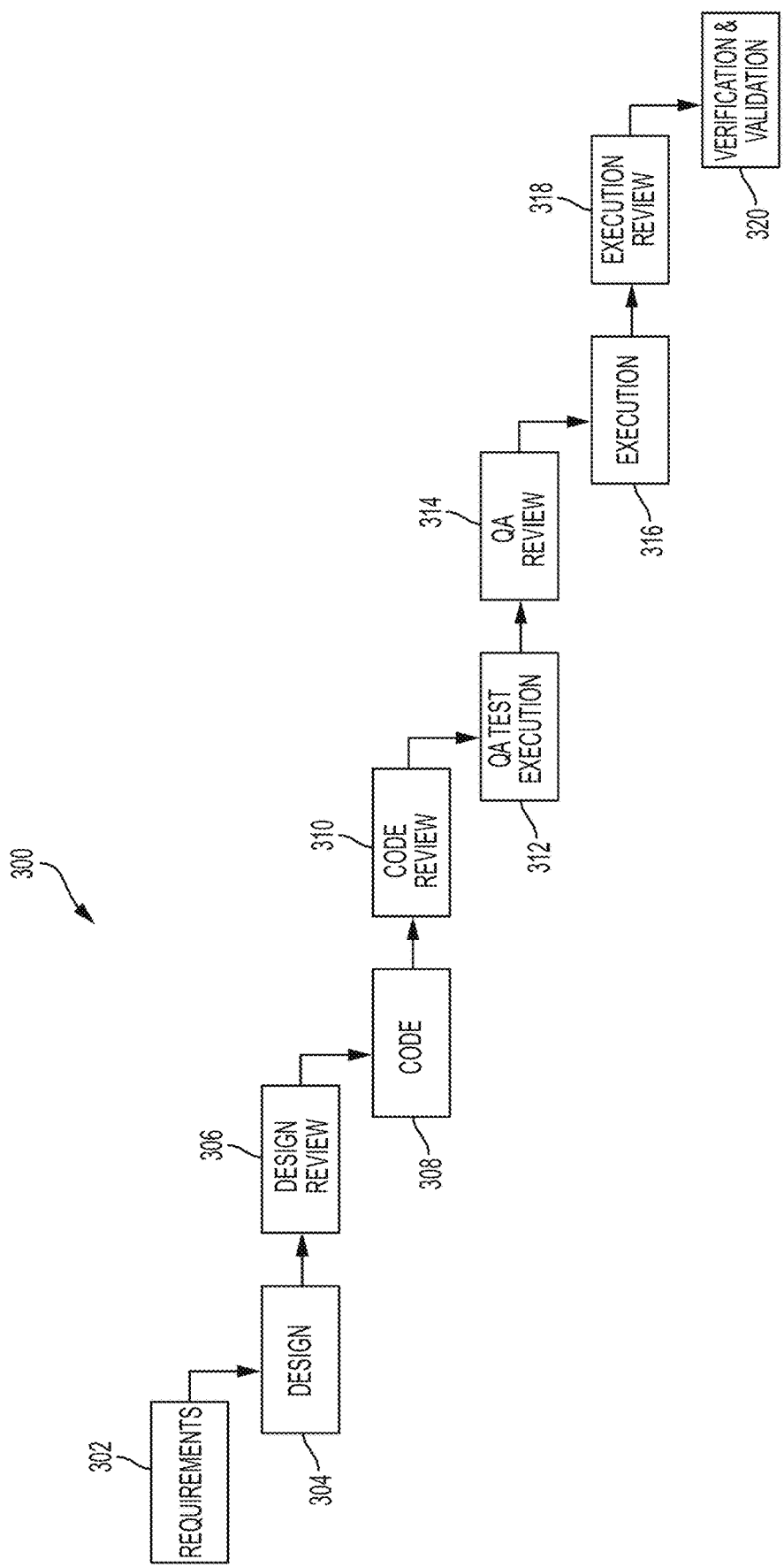
FIG. 3 depicts a process flow according to some embodiments of the present invention.

FIG. 3 depicts an example of a process flow 300 for a software development process according to an embodiment and is described in reference to FIGS. 1-3. In embodiments, developers can receive requirements 302 that describe desired functionality to be implemented in one or more code files. Developers can create a design 304 to comply with the requirements 302 and document the design 304 through user systems 112 of FIG. 1. The design 304 can be expressed in terms of words, graphs, pseudo-code, flowcharts, or other forms. The design 304 can be reviewed with respect to the requirements 302 as part of a design review 306. One or more experts can participate in the design review 306 to confirm that the design 304 meets constraints defined in the requirements 302. After making any changes resulting from the design review 306, developers can develop code 308 to implement the design 304 using the code development servers 102 of FIG. 1. In some embodiments, the design 304 is inherently included in the code 308, such as with a pictures-to-code automated code generation tool and/or through embedded comments describing the design within the code 308. A code review 310 is performed with respect to the code 308. The code review 310 can involve one or more review tools, such as a static code analyzer, a unit/module/graph test tool, a visual inspection, and/or other review approaches. If errors or issues are noted during the code review 310 and/or the design review 306, the results can be logged as code development data to support process improvements.

After making any changes resulting from the code review 310, quality assurance test execution 312 can be performed on a number of quality assurance test cases prior to releasing the code 308 for execution testing. A quality assurance review 314 of the quality assurance test execution 312 can include verifying that the code 308 meets the requirements 302. The quality assurance test execution 312 can be performed in a simulator/test environment that may include instrumentation options that are not available during normal execution in a target environment. Quality assurance defects identified in the quality assurance review 314 can be logged as code development data to assist, for example, in determining whether developers of the design 304 and/or code 308 are correctly interpreting the requirements 302 and adequately addressing potential error conditions. Depending on the types of issues identified through the quality assurance review 314, changes may be made to the design 304 and/or code 308 to correct any defects before code files including the code 308 can be transferred to the code execution servers 104 of FIG. 1 for execution 316. Results of the execution 316 can be captured/logged and reviewed as part of an execution review 318. For example, the execution review 318 can determine an execution time, a level of resource utilization, whether any error codes resulted, and other such data collection. Results of the execution review 318 can be provided for verification and validation 320 to confirm that the requirements 302 were successfully met and no unexpected errors were detected when executing in a target environment. If it is determined that the requirements 302 were not met or unexpected errors were detected, the design 304 and/or code 308 can be updated to address any identified issues.

While process flow 300 illustrates one example of a code development process, it will be understood that other code development processes can be supported in embodiments, such as a rapid application development model, an agile development model, a modified waterfall development model, a spiral development model, and other such development models known in the art.

Figure 4:
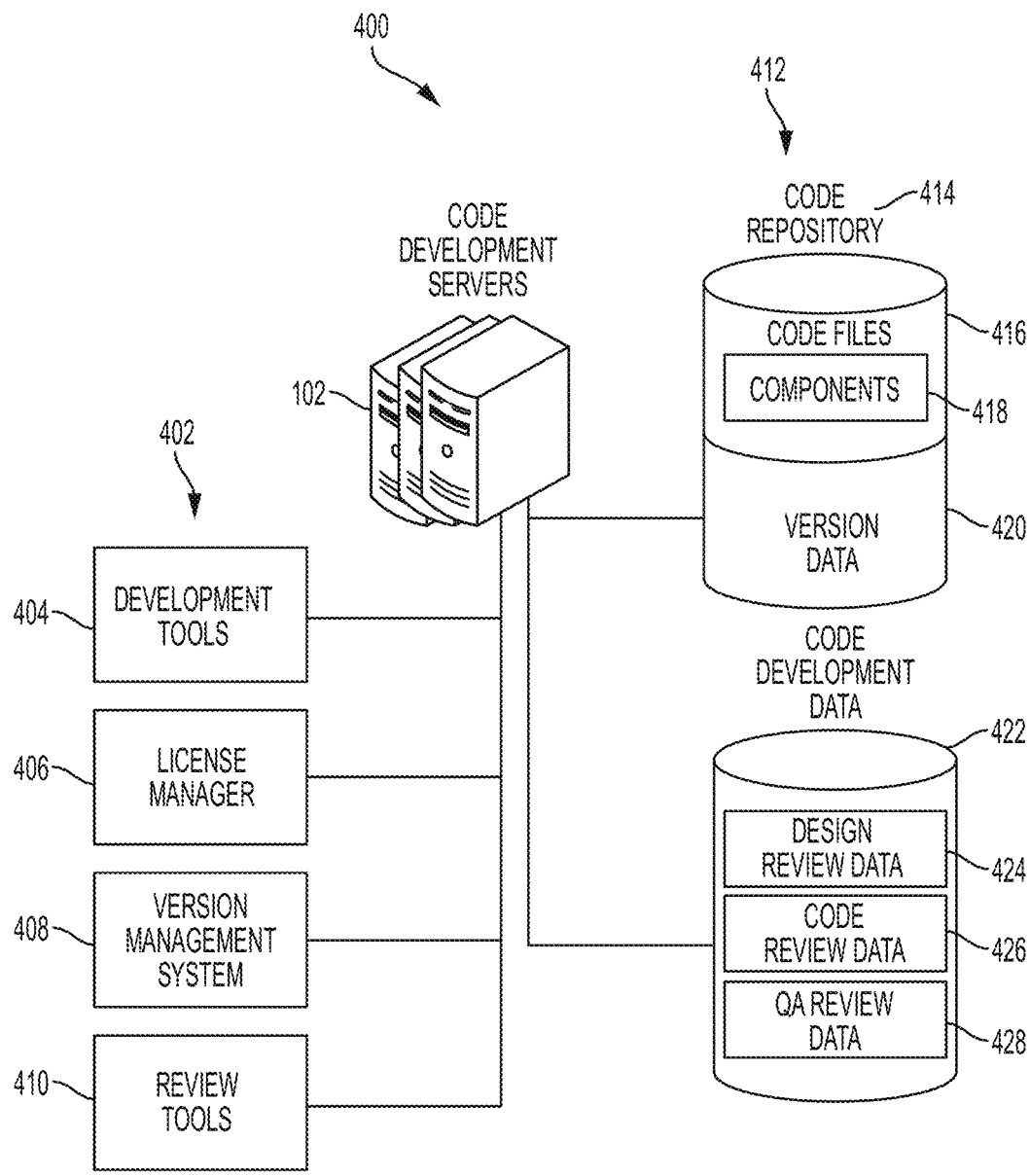
FIG. 4 depicts a block diagram of a code development system according to some embodiments of the present invention.

FIG. 4 depicts a block diagram of a code development system 400 according to some embodiments. The code development system 400 can implement the code 308 and code review 310 processes of the process flow 300 of FIG. 3 using the code development servers 102. The code development system 400 may also support development of the design 304 and/or performance of the quality assurance test execution 312 of FIG. 3. Further, the code development system 400 may be used for other review processes, such as the design review 306 and the quality assurance review 314 of FIG. 3. The code development servers 102 can be distributed in multiple locations, such as multiple software development entities that separately and/or collectively develop the code 308 for execution 316 on the code execution servers 104 of FIG. 1. To support development and review operations, the code development servers 102 are operable to execute a plurality of applications 402, such as development tools 404, a license manager 406, a version management system 408, and review tools 410. The development tools 404 can include code compilers, linkers, environment simulators, debuggers, editors, and other such tools. The license manager 406 can allow developers to check out licenses while running the development tools 404. For example, there may be many more developers than licenses available for running one or more of the development tools 404, and the license manager 406 can control whether/when developers can access licenses to run the development tools 404.

A storage system 412, including a code repository 414, is accessible by the code development servers 102. The code repository 414 can store a plurality of code files 416, where each of the code files 416 can include or link to one or more components 418. The components 418 can comprise graphs, modules, functions, routines, processes, objects, and/or any other subdivision or combination of the code files 416. The code repository 414 can also include version data 420 to track versions and change history of the code files 416. The version management system 408 can control access to code files 416 and update version data 420 as new/updated versions of the code files 416 are checked-in to the code repository 414. The storage system 412 may also include code development data 422. Code development data 422 can track development and quality data of the code files 416 using, for example, the review tools 410. The review tools 410 can enable assessments of code 308 as part of the code review 310. For example, code 308 may be required to be reviewed prior to allowing the code files 416 to be updated with a new/changed version of the code 308 in the code repository 414.

Review tools 410 can analyze code 308 and/or code files 416 for compliance with design/coding standards, efficient use of data structures, function calls, looping/branching, conditional operations, resource requests, and interaction with other components 418. The review tools 410 can also include support for the design review 306, such as establishing traceability between the requirements 302 and the design 304 of FIG. 3. The review tools 410 may also include quality assurance tools to support the quality assurance test execution 312 and quality assurance review 314 of FIG. 3. Metrics and analysis data resulting from the review tools 410 can be stored in the code development data 422 for later analysis, such as collection/storage in the data warehouse system 106 and/or analysis use by the analysis system 108 of FIG. 1. For instance, results of the design review 306 can be captured as design review data 424 in the code development data 422. Results of the code review 310 can be captured as code review data 426 in the code development data 422. Results of the quality assurance review 314 can be captured as quality assurance review data 428 in the code development data 422. The results of reviews can be tracked with respect to developers, developer entities, types of applications/programs under development, file versions, and other such data. The code development data 422 may capture metrics/results from the use of other applications 402, such as usage patterns/results of development tools 404, license usage through license manager 406, and modifications through the version management system 408. For instance, outputs of the development tools 404 or review tools 410 can include indications of linking/reuse of library files, lines-of-code counts, number of errors identified per lines-of-code, code complexity in terms of data structures, branching, conditional logic use, and other such data. A rate of license usage and/or time of license usage of tools through the license manager 406 can also be tracked in the code development data 422. For instance, a larger number of compiler license uses for a newly developed version of the code files 416 may be indicative of a greater level of complexity that may also increase the risk of bugs/errors. Further, code files 416 with a larger number of total lines or expected execution time may represent a greater risk of bugs/errors being present.

Figure 5:
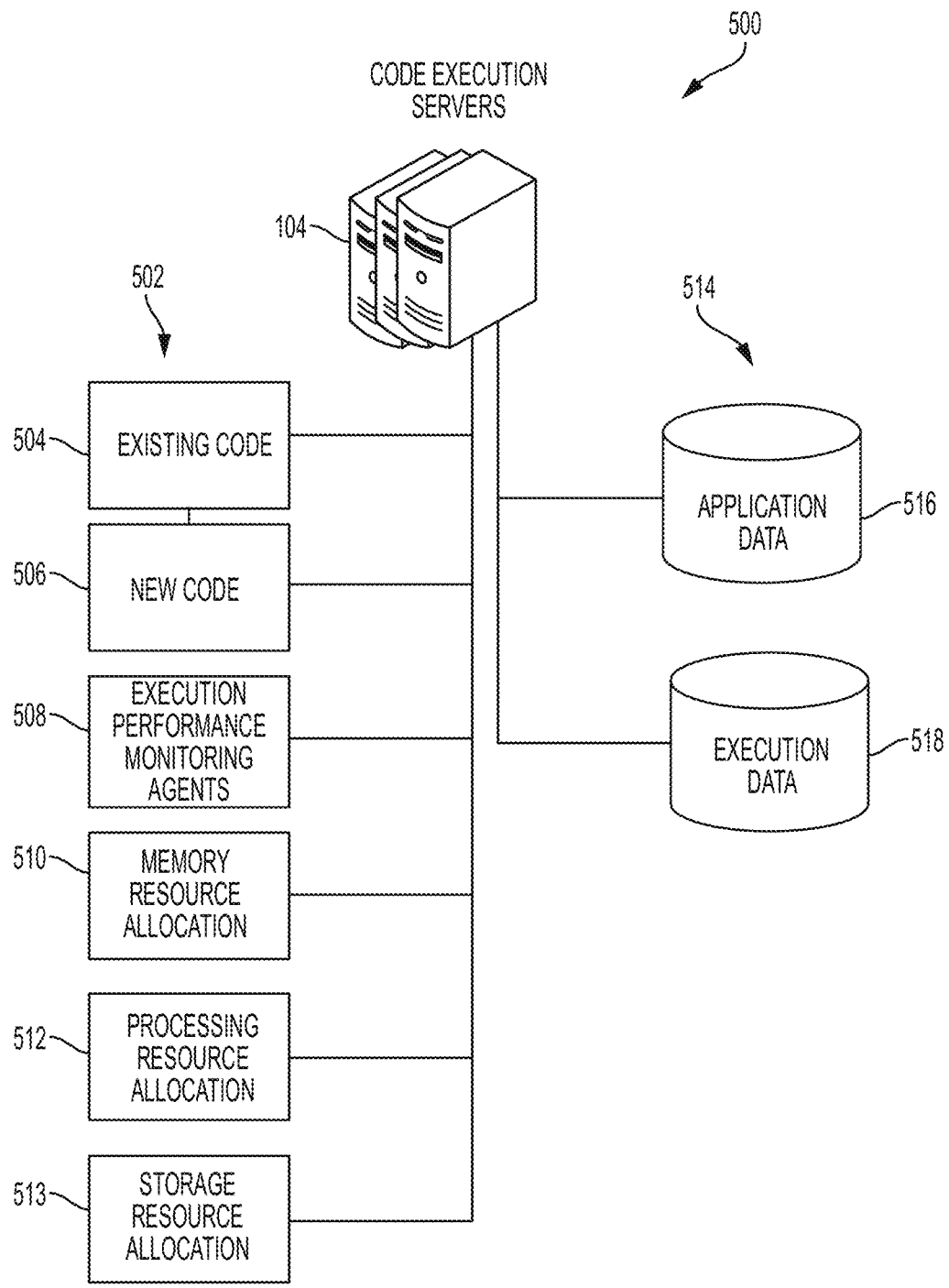
FIG. 5 depicts a block diagram of a code execution system according to some embodiments of the present invention.

FIG. 5 depicts a block diagram of a code execution system 500 according to some embodiments. The code execution system 500 can implement the execution 316 and execution review 318 processes of the process flow 300 of FIG. 3 using the code execution servers 104. The code execution servers 104 can be distributed in multiple locations and may be remotely located relative to the code development servers 102 of FIG. 1. To support execution and review operations, the code execution servers 104 are operable to execute a plurality of applications 502 including existing code 504 that may interact with or incorporate new code 506. The applications 502 can also include, for example, execution performance monitoring agents 508, memory resource allocation 510, processing resource allocation 512, and/or storage resource allocation 513. The execution performance monitoring agents 508, memory resource allocation 510, processing resource allocation 512, and storage resource allocation 513 can be incorporated in one or more operating systems, virtual machines, and/or virtual machine monitors depending upon the processing architecture of the code execution servers 104.

A storage system 514 can store application data 516 and/or execution data 518. Application data 516 can include values used to support execution 316 of the existing code 504 and/or new code 506, where the new code 506 represents one or more selected files from the code files 416 of FIG. 4 in an executable form. Application data 516 can include data files and databases that support operation of the applications 502. Memory resource allocation 510 can reserve one or more blocks of system memory (e.g., physical server memory, such as from memory device 210 of FIG. 2) to support execution 316 of the existing code 504 and/or new code 506. Processing resource allocation 512 can reserve processors or processing systems on particular servers of the code execution servers 104 to support execution 316 of the existing code 504 and/or new code 506. Storage resource allocation 513 can reserve disk space for larger-scale input/output operations (e.g., terabyte-scale storage, such as from secondary storage 220 of FIG. 2) to support execution 316 of the existing code 504 and/or new code 506. The execution data 518 can include metrics gathered before, during, and after execution 316 of the existing code 504 and/or new code 506 to support execution review 318, data gathering for the data warehouse system 106, and/or analysis by the analysis system 108.

Examples of the execution data 518 can include records of resource utilization prior, during, and after execution 316 as monitored by the execution performance monitoring agents 508. The execution performance monitoring agents 508 may also track total execution time, error code generation, interactions with other systems, and other activities for storage in the execution data 518.

Figure 6:
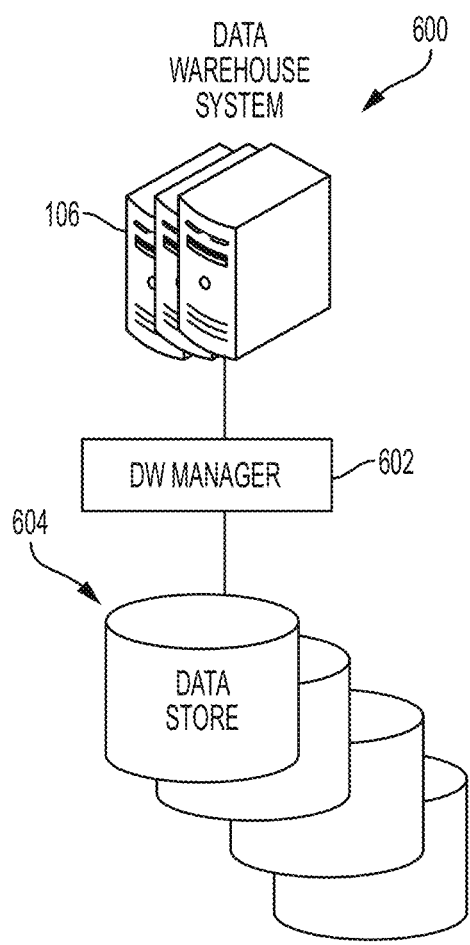
FIG. 6 depicts a block diagram of a data warehouse system according to some embodiments of the present invention.

FIG. 6 depicts a block diagram of a data warehouse 600 according to some embodiments. The data warehouse 600 can include the data warehouse system 106 of FIG. 1 with one or more servers that may be in close physical proximity or distributed between two or more different geographic locations. A data warehouse manager 602 provides access and storage management for a data store 604 that can be formed of multiple storage devices. For example, the data store 604 can be a cloud-based storage facility. The data warehouse manager 602 provides a control framework, such as a file system, for processing data to be stored in or retrieved from the data store 604. The data warehouse 600 can be configured to access data from the code development system 400 of FIG. 4 and the code execution system 500 of FIG. 5 to pool and/or reformat data for use by the analysis system 108 of FIG. 1. For example, the data warehouse system 106 can gather records from the code development data 422 of FIG. 4 and the execution data 518 of FIG. 5 over a period of time. The data warehouse manager 602 can reformat data received in various formats into a common format for storage in the data store 604. Capturing data in the data warehouse system 106 enables the analysis system 108 to access the data on-demand without interfering with ongoing development and code execution by the code development system 400 and the code execution system 500. Further, if the code development data 422 or the execution data 518 is erased, corrupted, or inaccessible, the data warehouse system 106 provides a long-term storage option that may have storage capacity greater than the storage system 412 of FIG. 4 or the storage system 514 of FIG. 5.

Figure 7:
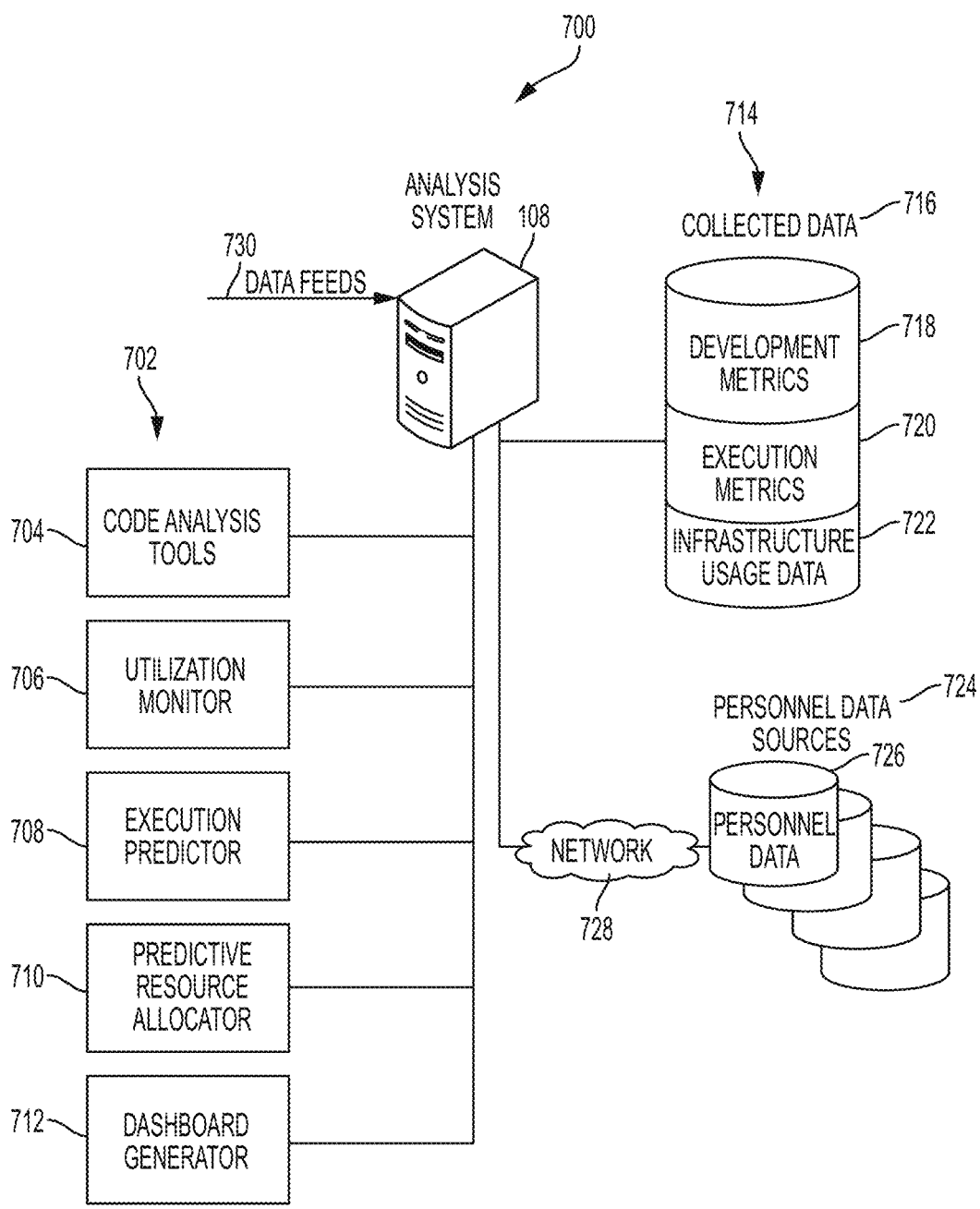
FIG. 7 depicts a block diagram of an analysis system according to some embodiments of the present invention.

FIG. 7 depicts a block diagram of a system 700 according to some embodiments. The system 700 can include the analysis system 108 of FIG. 1 and can be formed from one or more servers operable to analyze code files 416 of FIG. 4 developed on the code development servers 102. In contrast to the code review 310 performed by the review tools 410 of FIG. 4, the analysis performed by the analysis system 108 can interpret the code development data 422 and the execution data 518 associated with a developer or entity and determine whether a selected one or more code files 416 have a greater or lesser likelihood of experiencing issues during execution 316 on the code execution servers 104. For example, as developer and/or entity scores are generated with respect to historical data, the developers or entities producing a greater level of defects, inefficiencies, utilization issues, and the like can be identified as presenting a greater execution risk. Rather than allowing code files 416 generated by developers and entities having a greater execution risk from gaining unconstrained access to the code execution servers 104, embodiments can use predictive allocation to limit an amount of resources available and/or an available execution time-of-day for selected instances of the code files 416 to perform execution 316.

In the example of FIG. 7, the analysis system 108 can execute multiple applications 702, such as one or more code analysis tools 704, a utilization monitor 706, an execution predictor 708, a predictive resource allocator 710, a dashboard generator 712, and/or other applications (not depicted). A storage system 714 can include collected data 716, such as development metrics 718, execution metrics 720, infrastructure usage data 722, and/or other data (not depicted). The storage system 714 may also support remote access of other data sources, such as personnel data sources 724 including personnel data 726 of developers of the code 308 and may use another network 728 to access the personnel data sources 724.

Data feeds 730 from the code development system 400 of FIG. 4, the code execution system 500 of FIG. 5, and/or the data warehouse 600 of FIG. 6 can be used to populate the collected data 716 as a working set of data relevant to one or more code files 416 under analysis. The code analysis tools 704 can examine the development metrics 718 and personnel data 726 to determine a developer profile in terms of developer attributes from the personnel data 726 and a history of observed development activities from the development metrics 718. For example, the personnel data 726 can indicate a level of experience or seniority of a developer, such as work history, job performance reviews, job skills, work location, and other such information. The development metrics 718 can be analyzed for quality history results from previous issues identified through design reviews 306, code reviews 310, and quality assurance reviews 314 associated with the developer, for instance, as captured in the design review data 424, code review data 426, and quality assurance review data 428 of FIG. 4. The development metrics 718 may track how many code files 416 and/or components 418 that the developer has successfully developed along with any observed trends (e.g., a change in error rate, a change in code complexity, etc.) This information can be used to determine a code efficiency rating, a code quality rating, and/or other ratings, which may be further scaled or compared relative to other developers. For instance, scoring can be relative to other developers with a similar skillset, a similar level of seniority, a similar worksite, or other such criteria.

The utilization monitor 706 can examine the infrastructure usage data 722 to track historic resource usage of code files 416 created by the developer. For example, the infrastructure usage data 722 can include the previous usage level of memory resources and processing resources of the code execution servers 104 from a previous execution 316. The infrastructure usage data 722 can also track interaction or invocations of the existing code 504 when new code 506 created by the developer was previously invoked. The infrastructure usage data 722 may also track interactions and usage of application data 516, including accesses to database systems. The infrastructure usage data 722 can be compared between developers and may be further analyzed based on usage history in creating similar application types, of developers with a similar skillset, a similar level of seniority, a similar worksite, or other such criteria. Utilization data may be decomposed into system utilization, database utilization, disk utilization, license utilization, and other such utilization categories. Developers with a history of creating code 308 that places a greater demand upon system resources may be given a different usage score than developers with a history of using fewer resources.

The execution predictor 708 can analyze execution metrics 720 to determine past execution metrics associated with the developer. For instance, the execution metrics 720 may include records of errors previously encountered during execution 316, results of execution review 318, and/or verification and validation 320 of code files 416 previously developed, executed, and verified for the developer. Developers with a history of more execution errors, verification issues, and/or inefficiencies in execution 316 can be scored differently than developers with fewer errors, verification issues, and efficient execution 316. The personnel data 726 can also be used to establish a relative scoring confidence, where results of developers with a longer work history or skillset history may be assigned a higher confidence weighting in score results. For instance, results of a developer with a skillset that matches the current application under development and a history of validating more than fifty components 418 may have a higher confidence weighting than a developer with less observed work history for the skillset and fewer than ten components 418 validated. The execution predictor 708 can use scoring outputs from the code analysis tools 704 and the utilization monitor 706 in combination with execution prediction scoring to determine a predicted code execution performance score of one or more selected files of the code files 416 based on one or more of the development metrics 718 from the code development data 422, the execution metrics 720 from the execution data 518, and the infrastructure usage data 722. The predicted code execution performance score can be indicative of a predicted likelihood of a code quality issue in the one or more selected files. The predicted code execution performance score can be further weighted using the personnel data 726, code complexity data, and/or other history data associated with the developer.

The predictive resource allocator 710 predictively allocates one or more resources of the code execution servers 104 associated with execution of one or more selected files of the code files 416 based on the predicted code execution performance score. For example, the predictive resource allocator 710 may determine that the new code 506 should be limited to requesting 25% to 75% of the maximum available resources in view of an increased likelihood of inefficient resource utilization that may otherwise limit the effectiveness of the existing code 504. The predictive resource allocator 710 can communicate resource allocation constraints to the memory resource allocation 510, the processing resource allocation 512, and/or storage resource allocation 513. Further, the predictive resource allocator 710 may communicate a priority or scheduled time-of-day adjustment to the code execution servers 104 to constrain when execution 316 of the new code 506 should be performed.

The dashboard generator 712 can output analysis results to one or more of the user systems 112 of FIG. 1. For example, the dashboard generator 712 may enable an administrator or manager to see historical performance and efficiency data for a developer, an entity, or organization. The information displayed by the dashboard generator 712 can also assist in determining whether actions of the predictive resource allocator 710 are warranted or if any decision criteria should be adjusted to maintain or improve performance of the code execution servers 104.

Figure 8:
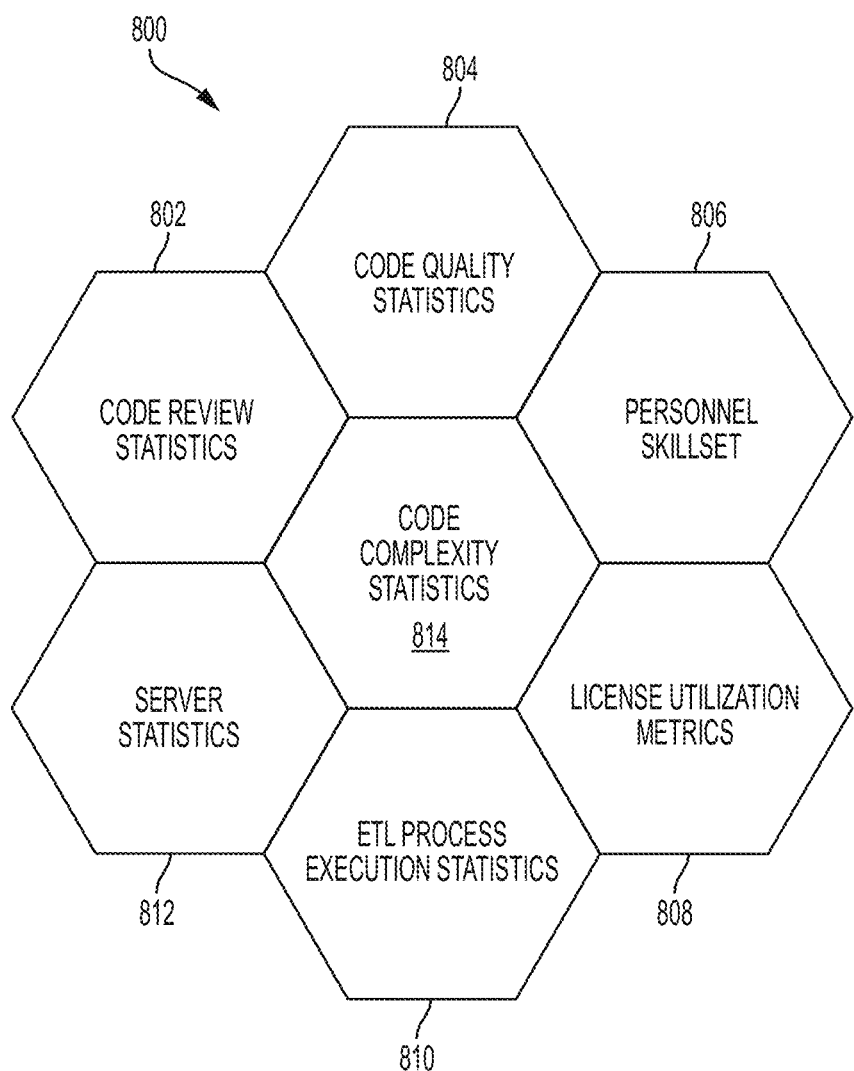
FIG. 8 depicts a block diagram of data domains according to some embodiments of the present invention.

FIG. 8 depicts a block diagram of data domains 800 according to some embodiments. The data domains 800 can include code review statistics 802, code quality statistics 804, personnel skillset 806, license utilization metrics 808, process execution statistics 810, server statistics 812, and code complexity statistics 814. The data domains 800 are examples of the types of data analyzed in determining the predicted code execution performance score by the analysis system 108 of FIG. 7. The values from the data domains 800 may also be displayed by the dashboard generator 712 of FIG. 7. The code review statistics 802, the code quality statistics 804, and the code complexity statistics 814 can be values determined by the review tools 410 of FIG. 4 and captured in the code development data 422 of FIG. 4 and development metrics 718 of FIG. 7. The personnel skillset 806 can include values extracted from the personnel data 726 of FIG. 7. The license utilization metrics 808 can include development license usage data from the license manager 406 and/or execution license usage data observed by the utilization monitor 706 of FIG. 7. The process execution statistics 810 can include values from the execution metrics 720 of FIG. 7. The server statistics 812 can include allocation and usage data from the infrastructure usage data 722. It will be understood that additional or fewer data sources can be included in the data domains 800.

Figure 9:
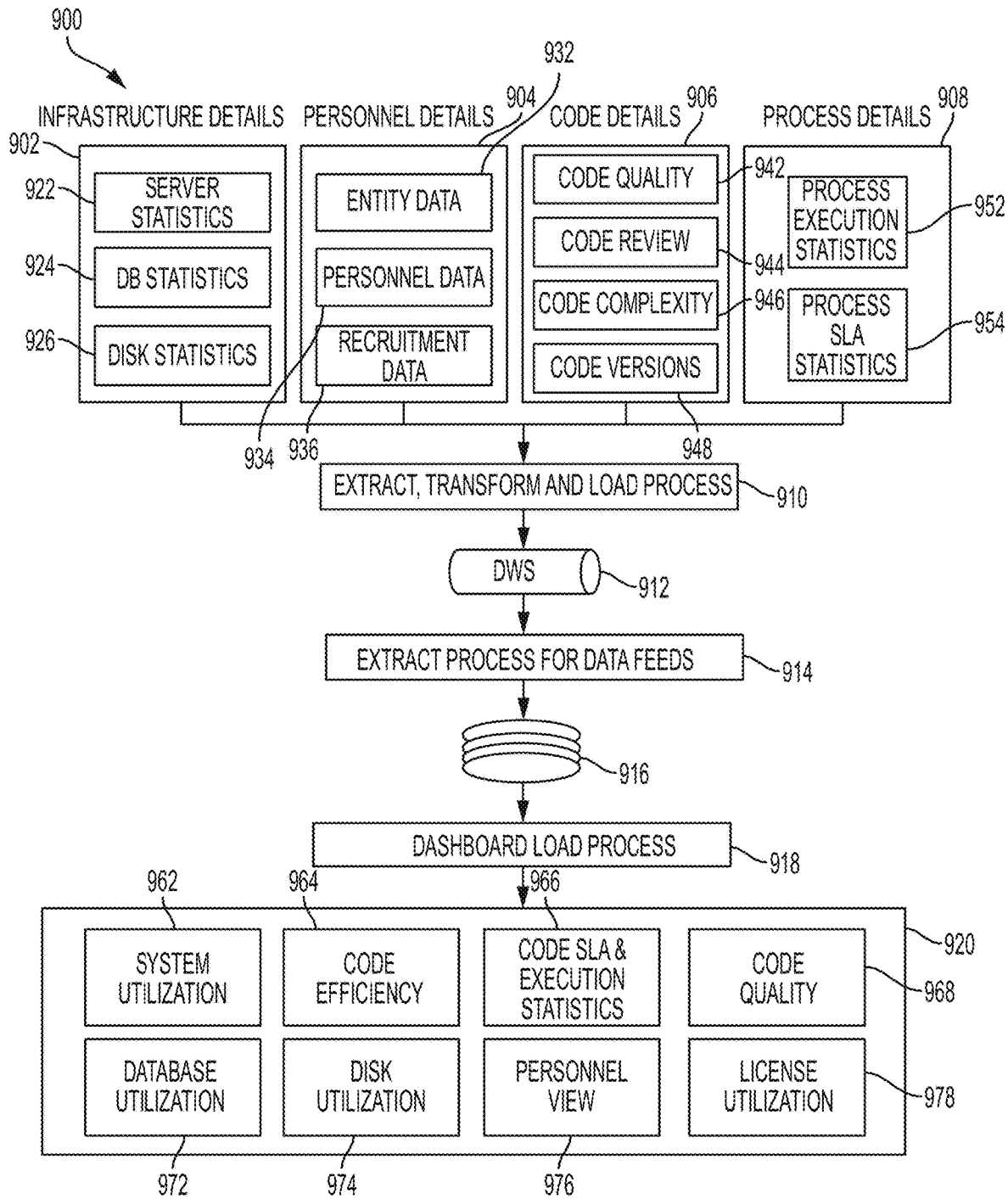
FIG. 9 depicts a process flow according to some embodiments of the present invention.

FIG. 9 depicts a process flow 900 according to some embodiments. Infrastructure details 902, personnel details 904, code details 906, and process details 908 provide data to an extract, transform, and load (ETL) process 910. Data warehouse system 912 is an embodiment of the data warehouse system 106 of FIGS. 1 and 6. An extract process 914 extracts data from the data warehouse system 912 to generate the data feeds 730 of FIG. 7 for the analysis system 108 of FIGS. 1 and 7. A network area storage system 916 can be used to buffer data for a dashboard load process 918 to supply data for a dashboard interface 920, which may be populated by the dashboard generator 712 of FIG. 7.

Examples of infrastructure details 902 can include server statistics 922 of the code execution servers 104, database statistics 924 associated with accesses of a database, such as application data 516, and disk statistics 926 associated with execution of new code 506 on the code execution servers 104. In some embodiments, the infrastructure details 902 can be captured by the execution performance monitoring agents 508. Examples can include analytics and reports generated at an individual user level, at a particular project level, and also at department level using a custom mapping that can hold relations between users and user identifiers and between processes, database identifiers, and projects. The infrastructure details 902 can also be observed by the utilization monitor 706 and buffered in infrastructure usage data 722 for prescriptive and predictive analytics.

Examples of personnel details 904 can include entity data 932, personnel data 934, and recruitment data 936 gathered from the personnel data sources 724 of FIG. 7. Various personnel details, such as resource names, skillsets, vendor details, location details, experience in various technologies, and recruitment details can be included in the personnel details 904. Recruitment data may identify one or more interviewers of the developers, job descriptions used for recruitment, recruitment notes, and the like. The personnel details 904 can be analyzed for patterns and markers that may identify one or more shared characteristics of higher performing developers. The personnel details 904 can be collected by writing and deploying customer agents on to various systems that host the data sets. The personnel details 904 may be joined with various other objective system details, such as process execution statistics to determine whether there is any correlation between resource skills and process optimization, and if there is, identify any critical markers to support replicating successes. Examples of correlations tested can include correlations between resource skillsets and optimized code, correlations between resource location and optimized code, correlations between interview panels and resource skills and efficient processes, correlations between resource location and code quality, and other such correlations.

Examples of code details 906 can include code quality 942, code reviews 944, code complexity 946, and code versions 948. Various custom adapters and agents can be deployed to capture and analyze metadata stored in the code repository 414 and also databases, such as the code development data 422. Some of the metadata captured and analyzed can include statistics from the design review 306 and code review 310, which may include information identifying common mistakes of various developers of the code files 416 in code reviews 944. Code quality statistics from the code quality 942 can include details captured from testing life cycle management systems, such as how many defects are open against a requirement, against a code snippet, against a developer, against a project, and the like, which may be collected as part of the quality assurance review 314 and/or other reviews. Code complexity metrics from code complexity 946 can include a list of various components 418 within code 308, an indicator of how complex the code 308 is depending on the type of components 418 used and depending on the type of code 308 written within included functions. Metrics from the code details 906 can be useful in determining the number of resources working on a project compared to the complexity and may identify resource productivity for comparisons with resources across an organization, across various vendors, across various locations, and the like.

Code version metrics of the code versions 948 can include details, such as how many versions of the code 308 are being checked-in as code files 416 with version data 420. When tied with code quality metrics and code execution metrics, the code version metrics can provide an indication of how volatile the requirements 302 are and correlations with performance characteristics of the code 308.

Examples of process details 908 can include process execution statistics 952 and process service level agreement (SLA) statistics 954. Custom code components and agents can be deployed across various code execution servers 104 to capture process logs from various operating systems, applications, and databases, for example, using execution performance monitoring agents 508. The execution data 518 collected can be parsed and processed to capture various pieces of information, such as job start and end time, various sub-component start and end times, system resources, such as CPU and TO, consumed by the sub-components, data size processed, record counts, and the like. Using these data points, various analytics can be run to identify long running processes and for optimizing to increase efficient use of available system resources.

The job SLA information can also be collected and joined with process information for proactively identifying any correlations between process execution statistics 952 and process SLA statistics 954. For example, process details 908 can be used to determine whether an increase in data volumes and increasing job execution times have an impact on job SLA. The process details 908 can be used to determine whether there any correlations between data volumes and time periods when a job runs. The process details 908 can also be joined with other data assets captured from infrastructure details 902, personnel details 904, and/or code details 906 for prescriptive and predictive analytics to improve efficiencies and leverage correlations across the data sets. For example, the details 902-908 can be collectively analyzed by the analysis system 108 to determine whether there is any correlation between job SLAs with the developer, with the code complexity, and/or with the code stability. Other examples may include determining whether any correlation exists between job SLAs and the location of the developers of the code 308. As another example, correlations may be identified between job SLAs and technical skills across multiple technologies of the developer.

The ETL process 910 may include reading various data sets from the details 902-908 and joining the data to leverage linkages present in the data for further analysis. Custom code can be written in native technologies to support the ETL process 910, and all the processed data sets can be stored in the data warehouse system 912 to leverage scalability aspects of analytics. The ETL process 910 can perform processing of structured and/or unstructured data sets. The ETL process 910 can write data sets in data formats that leverage data modelling, such as various NoSQL formats, various serialization formats, and the like for scalability, extensibility, and portability. The ETL process 910 can be implemented in a form that is platform and distribution agnostic. The ETL process 910 may work on various big-data platforms and also on local and cloud infrastructures. The ETL process 910 can be created in a componentized manner such that future additions to the data domains 800 are less burdensome to deploy. The ETL process 910 can be built with various audits, balances, controls, detail logging frameworks, restart ability, and recoverability. This enables the ETL process 910 to scale with data volumes and also enables the ETL process 910 to run asynchronously.

In one embodiment, the data warehouse system 912 can be implemented using Hadoop for storing data sets in the data store 604. The data warehouse system 912 can support a large volume of data. Since detailed data can be captured for multiple processes, servers, and code bases, the total data volume may grow rapidly over a period of time. A large data processing infrastructure of the data warehouse system 912 can support large data volumes, computing, and analytical processing. The data captured can include a variety of formats, such as structured (e.g., data from databases), semi-structured (e.g., data from process logs), and unstructured data (e.g., free-form text and emails). The data warehouse system 912 can support data received on a continuous or near continuous basis in some embodiments.

The extract process 914 can pre-process data from the data warehouse system 912 and load it into organized data domains 800 that are joinable through common keys. The data can be exposed to end users in multiple formats through the data feeds 730, for example. Hive views may be created on top of the data set, which can include collected data 716 and personnel data 726. Analytics (e.g., code analysis tools 704, utilization monitor 706, and execution predictor 708) may be run on the views. In some embodiments, data can be extracted by leveraging custom-developed scripts and in-memory jobs. Extraction scripts can be automated and metadata driven. Resulting data files can be stored on the network area storage system 916, with access provided to analytical applications. For example, applications 702 can consume data from network area storage system 916 and perform further processing as previously described.

The dashboard load process 918 can extract data from the network area storage system 916 and make the data accessible to the dashboard interface 920. Examples of data available through the dashboard interface 920 include system utilization 962, code efficiency 964, code SLA and execution statistics 966, code quality 968, database utilization 972, disk utilization 974, personnel view 976, and license utilization 978. The data may also be used for cross-product analytics, such as server performance correlated with process performance, server performance correlated with code complexity, server performance correlated with resource location, SLA metrics correlated with server performance, storage capacity correlated with processes, and license utilization for multiple applications.

Figure 10:
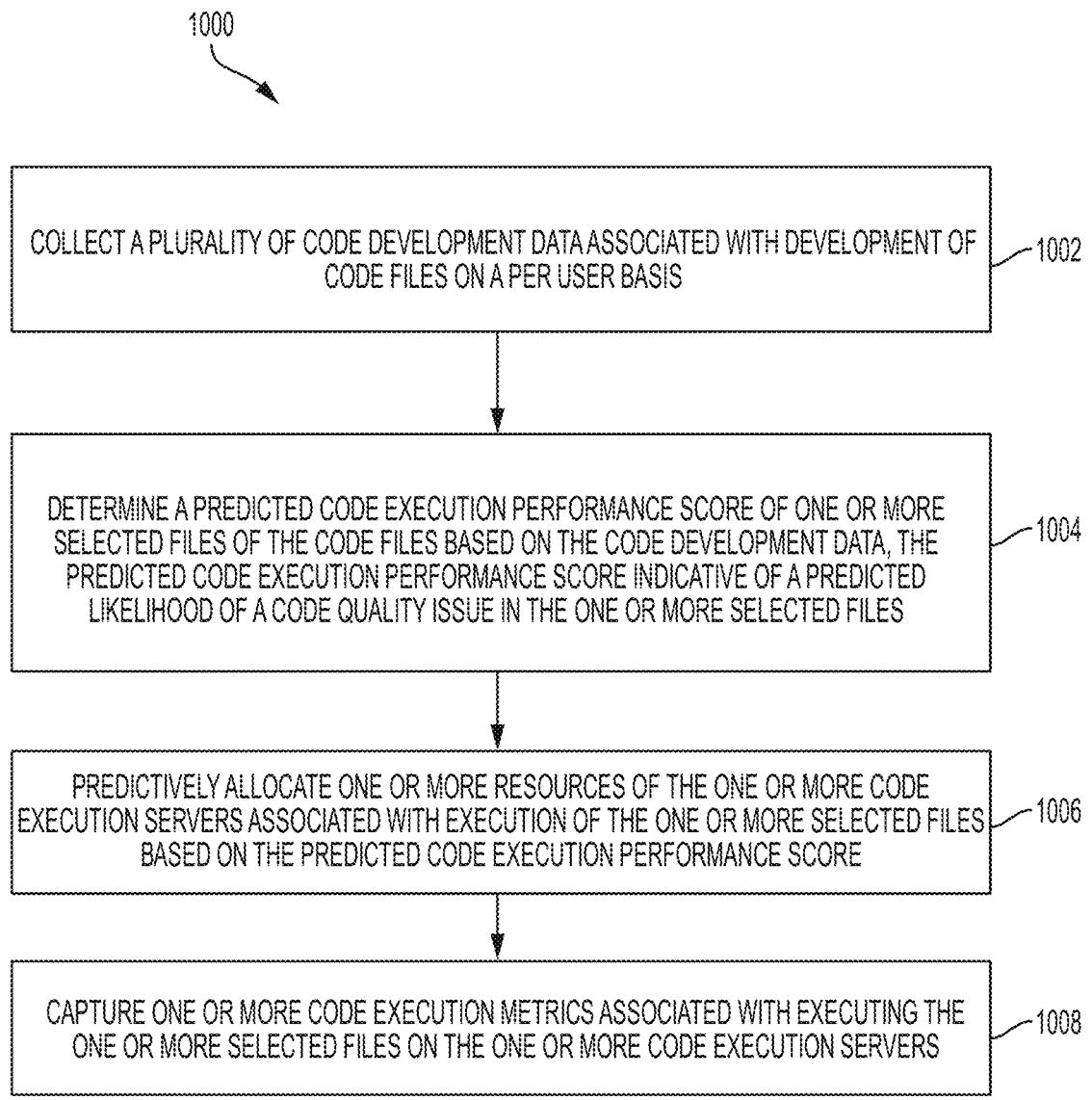
FIG. 10 depicts a process flow according to some embodiments of the present invention.

Turning now to FIG. 10, a process flow 1000 is depicted according to an embodiment. The process flow 1000 includes a number of steps that may be performed in the depicted sequence or in an alternate sequence. The process flow 1000 may be performed by the system 100 of FIG. 1. The process flow 1000 is described in reference to FIGS. 1-10.

At block 1002, a plurality of code development data 422 associated with development of the code files 416 can be collected on a per user basis and can be included in collected data 716 of the analysis system 108. The code development data 422 can include one or more of: design review data 424, code review data 426, and quality assurance review data 428 with statistics indicative of one or more errors identified in the code files 416, which can be based on the design review 306, code review 310, and/or quality assurance review 314. The code development data 422 may also or alternatively include a plurality of code quality 942 statistics indicative of one or more defects identified with respect to one or more requirements 302 associated with the code files 416 or a portion of code 308 in one or more of the code files 416. The code development data 422 may also or alternatively include a plurality of code complexity 946 metrics indicative of components 418 within the code files 416. The code development data 422 may also or alternatively include a plurality of code version 948 metrics indicative of a number of versions of the code files 416. The code files 416 can be stored in a code repository 414 using a version management system 408. An updated value of the code development data 422 can be determined responsive to a check-in operation of a new file or a new version of a file into the code repository 414 using the version management system 408.

At block 1004, a predicted code execution performance score of one or more selected files of the code files 416 can be determined by the analysis system 108 based in part on the code development data 422. The predicted code execution performance score is indicative of a predicted likelihood of a code quality issue in the one or more selected files. The predicted code execution performance score can be adjusted based on one or more previously observed resource consumption patterns and a current level of resource consumption of the one or more code execution servers 104. One or more data values used to determine the predicted code execution performance score can be adjusted based on detecting an error condition associated with a component 418 included in or used by the one or more selected files of the code files 416. One or more data values used to determine the predicted code execution performance score can be adjusted based on detecting performance exceeding a resource utilization limit associated with a component 418 included in or used by the one or more selected files of the code files 416. The predicted code execution performance score can be weighted based at least in part on a defect history of a user, a level of seniority of the user, an assigned work location of the user, and a level of code complexity 946 of the one or more selected files of the code files 416.

At block 1006, the analysis system 108 can predictively allocate one or more resources of the one or more code execution servers 104 associated with execution of the one or more selected files based on the predicted code execution performance score. Predictively allocating one or more resources can include adjusting one or more of a scheduled start time, an execution priority, setting a maximum processing resource threshold for the processing resource allocation 512, setting a maximum network resource threshold, setting a maximum memory usage threshold for the memory resource allocation 510, setting a maximum execution time threshold, and setting a maximum storage usage threshold for the storage resource allocation 513.

At block 1008, the analysis system 108 can capture one or more code execution metrics as execution metrics 720 associated with executing the one or more selected files on the one or more code execution servers 104. The one or more code analysis tools 704 or other application 702 of the analysis system 108 can interface with a plurality of execution performance monitoring agents 508 operable to track process execution time, subcomponent execution time, input/output resource utilization, processing resource utilization, memory resource utilization, and storage resource utilization to identify greater resource consuming trends and correlations on a per user basis. The analysis system 108 can monitor for the trends and correlations on a time-of-day basis.

Figure 11:
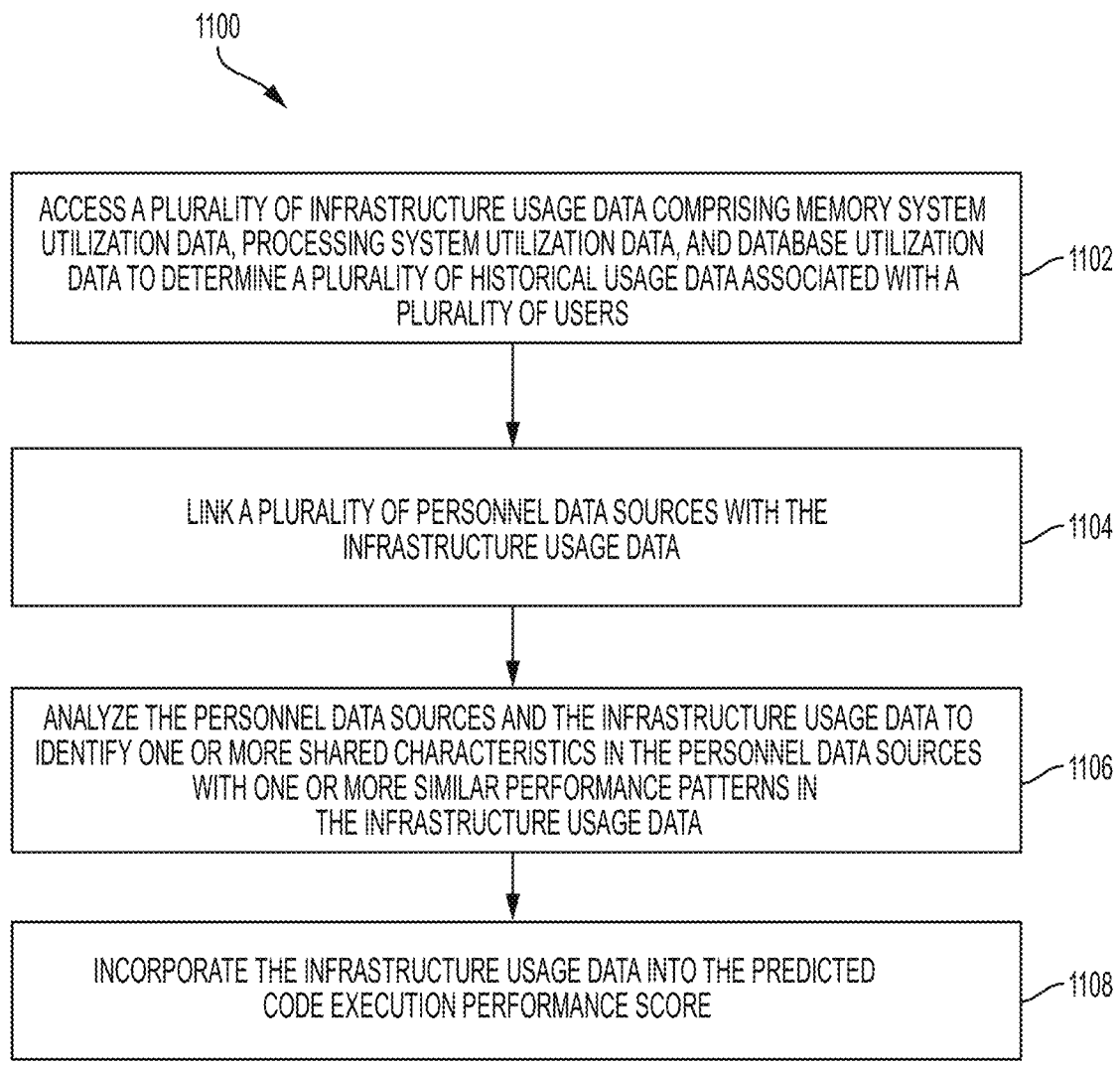
FIG. 11 depicts a process flow according to some embodiments of the present invention.

Turning now to FIG. 11, a process flow 1100 is depicted according to an embodiment. The process flow 1100 includes a number of steps that may be performed in the depicted sequence or in an alternate sequence. The process flow 1100 may be performed by the system 100 of FIG. 1. The process flow 1100 can expand upon the process flow 1000 of FIG. 10. The process flow 1100 is described in reference to FIGS. 1-11.

At block 1102, a plurality of infrastructure usage data 722 including memory system utilization data, processing system utilization data, and database utilization data can be accessed to determine a plurality of historical usage data associated with a plurality of users. At block 1104, a plurality of personnel data sources 724 is linked with the infrastructure usage data 722. At block 1106, the personnel data sources 724 and the infrastructure usage data 722 can be analyzed by the analysis system 108 to identify one or more shared characteristics in the personnel data sources 724 with one or more similar performance patterns in the infrastructure usage data 722. For example, the one or more shared characteristics can include one or more of: resource skill sets, resource locations, hiring data, and associated job descriptions. At block 1108, the analysis system 108 can incorporate the infrastructure usage data 722 into the predicted code execution performance score.

Figure 12:
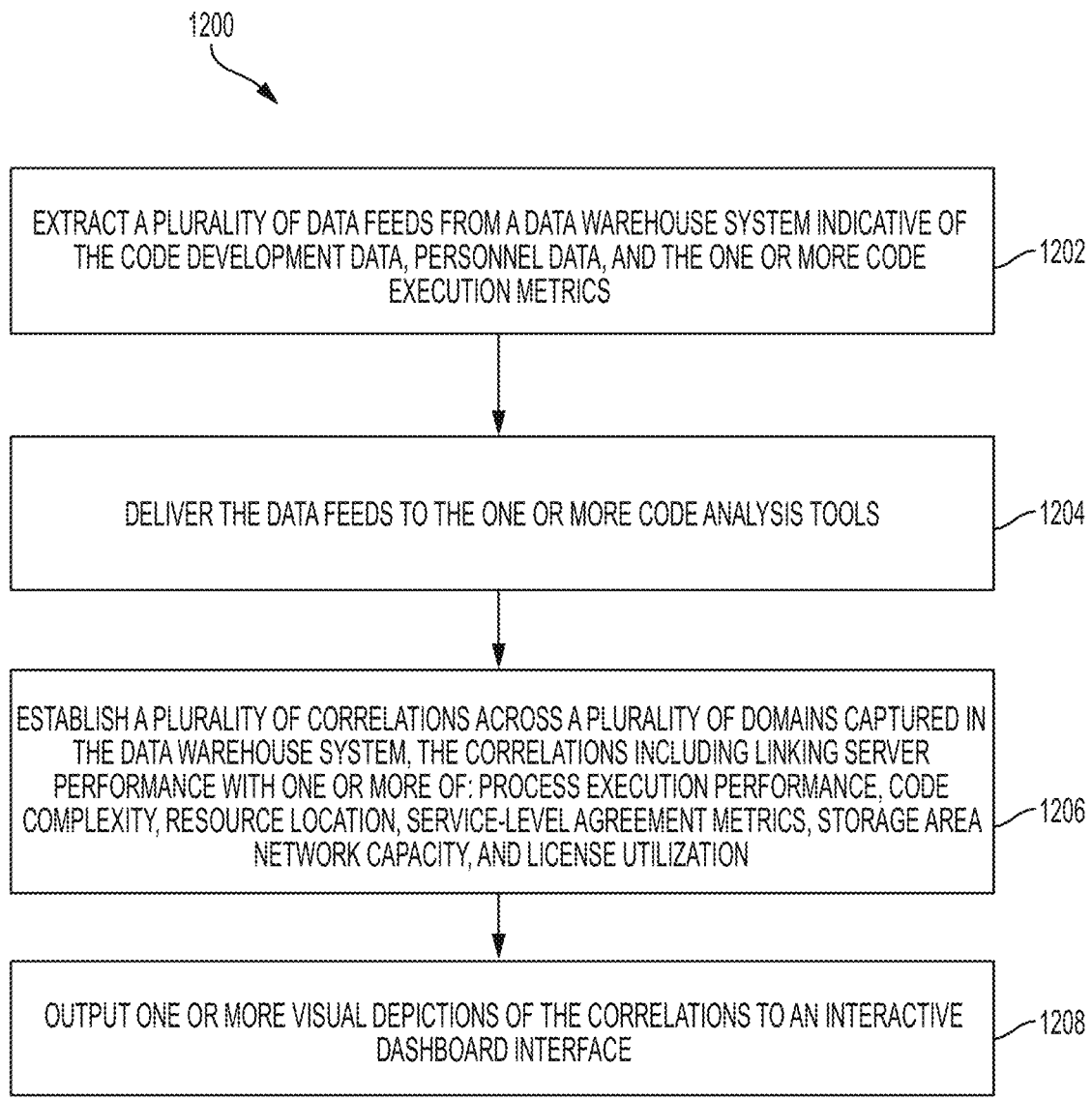
FIG. 12 depicts a process flow according to some embodiments of the present invention.

Turning now to FIG. 12, a process flow 1200 is depicted according to an embodiment. The process flow 1200 includes a number of steps that may be performed in the depicted sequence or in an alternate sequence. The process flow 1200 may be performed by the system 100 of FIG. 1. The process flow 1200 can expand upon the process flow 1000 of FIG. 10. The process flow 1200 is described in reference to FIGS. 1-12. In embodiments, a data warehouse system 106 is operable to store a plurality of records indicative of resource allocation of the one or more code execution servers 104 and one or more code execution metrics.

At block 1202, the analysis system 108 can extract a plurality of data feeds 730 from the data warehouse system 106 indicative of the code development data 422, personnel data 726, and the one or more code execution metrics from the execution data 518. At block 1204, the analysis system 108 can deliver the data feeds 730 to the one or more code analysis tools 704 and/or other applications 702. At block 1206, the analysis system 108 can establish a plurality of correlations across a plurality of domains captured in the data warehouse system 106. The correlations can include linking server performance with one or more of: process execution performance, code complexity 946, resource location, service-level agreement metrics, storage area network capacity, and license utilization. At block 1208, the analysis system 108 can output one or more visual depictions of the correlations to an interactive dashboard interface 920.

Technical effects include predictively allocating resources of code execution servers to improve performance of the code execution servers when executing newly developed code by reducing the risks of potential adverse impacts of the code upon execution.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded on to a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A method comprising:
   collecting, by one or more code analysis tools executed by at least one processing device, a plurality of code development data associated with development of a plurality of code files on a per user basis;
   determining, by the one or more code analysis tools executed by the at least one processing device, a predicted code execution performance score of one or more selected files of the code files based on weighting one or more developer attributes captured in the code development data on the per user basis, the predicted code execution performance score indicative of a predicted likelihood of a code quality issue in the one or more selected files, wherein the one or more developer attributes are based at least in part on personnel data comprising a level of developer experience and a history of observed development activities of an associated developer from review data of the code development data;
   predictively allocating, by the one or more code analysis tools executed by the at least one processing device, one or more resources of one or more code execution servers associated with execution of the one or more selected files based on the predicted code execution performance score; and capturing, by the one or more code analysis tools executed by the at least one processing device, one or more code execution metrics associated with executing the one or more selected files on the one or more code execution servers.

2. The method of claim 1, further comprising:

accessing a plurality of infrastructure usage data comprising memory system utilization data, processing system utilization data, and database utilization data to determine a plurality of historical usage data associated with a plurality of users; and incorporating the infrastructure usage data into the predicted code execution performance score.

3. The method of claim 2, further comprising:

linking a plurality of personnel data sources with the infrastructure usage data; and analyzing the personnel data sources and the infrastructure usage data to identify one or more shared characteristics in the personnel data sources with one or more similar performance patterns in the infrastructure usage data.

4. The method of claim 3, wherein the one or more shared characteristics comprise one or more of: resource skill sets, resource locations, hiring data, and associated job descriptions.

5. The method of claim 1, wherein the code development data comprises one or more of: design review data, code review data, and quality assurance review data with statistics indicative of one or more errors identified in the code files.

6. The method of claim 1, wherein the code development data comprises a plurality of code quality statistics indicative of one or more defects identified with respect to one or more requirements associated with the code files or a portion of code in one or more of the code files.

7. The method of claim 1, wherein the code development data comprises a plurality of code complexity metrics indicative of components within the code files.

8. The method of claim 1, wherein the code development data comprises a plurality of code version metrics indicative of a number of versions of the code files.

9. The method of claim 1, further comprising:

interfacing the one or more code analysis tools with a plurality of execution performance monitoring agents operable to track process execution time, subcomponent execution time, input/output resource utilization, processing resource utilization, memory resource utilization, and storage resource utilization to identify greater resource consuming trends and correlations on a per user basis.

10. The method of claim 9, further comprising:

monitoring for the trends and correlations on a time of day basis.

11. The method of claim 9, further comprising:

adjusting the predicted code execution performance score based on one or more previously observed resource consumption patterns and a current level of resource consumption of the one or more code execution servers.

12. The method of claim 1, wherein a data warehouse system stores a plurality of records indicative of resource allocation of the one or more code execution servers and the one or more code execution metrics.

13. The method of claim 12, further comprising:

extracting a plurality of data feeds from the data warehouse system indicative of the code development data, personnel data, and the one or more code execution metrics, wherein the data feeds are delivered to the one or more code analysis tools.

14. The method of claim 13, further comprising:

establishing a plurality of correlations across a plurality of domains captured in the data warehouse system, the correlations comprising linking server performance with one or more of: process execution performance, code complexity, resource location, service-level agreement metrics, storage area network capacity, and license utilization.

15. The method of claim 14, further comprising:

outputting one or more visual depictions of the correlations to an interactive dashboard interface.

16. The method of claim 1, further comprising:

adjusting one or more data values used to determine the predicted code execution performance score based on detecting an error condition associated with a component included in or used by the one or more selected files.

17. The method of claim 1, further comprising:

adjusting one or more data values used to determine the predicted code execution performance score based on detecting performance exceeding a resource utilization limit associated with a component included in or used by the one or more selected files.

18. The method of claim 1, wherein the code files are stored in a code repository using a version management system, and further comprising:

determining an updated value of the code development data responsive to a check-in operation of a new file or a new version of a file into the code repository using the version management system.

19. The method of claim 1, wherein predictively allocating one or more resources comprises adjusting one or more of a scheduled start time, an execution priority, setting a maximum processing resource threshold, setting a maximum network resource threshold, setting a maximum memory usage threshold, setting a maximum storage usage threshold, and setting a maximum execution time threshold.

20. A method comprising:

collecting, by one or more code analysis tools executed by at least one processing device, a plurality of code development data associated with development of a plurality of code files on a per user basis;

determining, by the one or more code analysis tools executed by the at least one processing device, a predicted code execution performance score of one or more selected files of the code files based on the code development data, the predicted code execution performance score indicative of a predicted likelihood of a code quality issue in the one or more selected files, wherein the predicted code execution performance score is weighted based at least in part on a defect history of a user, a level of seniority of the user, an assigned work location of the user, and a level of code complexity of the one or more selected files;

predictively allocating, by the one or more code analysis tools executed by the at least one processing device, one or more resources of one or more code execution servers associated with execution of the one or more selected files based on the predicted code execution performance score; and capturing, by the one or more code analysis tools executed by the at least one processing device, one or more code execution metrics associated with executing the one or more selected files on the one or more code execution servers.

21. The method of claim 20, further comprising:
accessing a plurality of infrastructure usage data comprising memory system utilization data, processing system utilization data, and database utilization data to determine a plurality of historical usage data associated with a plurality of users;
linking a plurality of personnel data sources with the infrastructure usage data;
analyzing the personnel data sources and the infrastructure usage data to identify one or more shared characteristics in the personnel data sources with one or more similar performance patterns in the infrastructure usage data, wherein the one or more shared characteristics comprise one or more of: resource skill sets, resource locations, hiring data, and associated job descriptions; and
incorporating the infrastructure usage data into the predicted code execution performance score.

22. The method of claim 20, wherein the code development data comprises one or more of: design review data, code review data, quality assurance review data with statistics indicative of one or more errors identified in the code files, a plurality of code quality statistics indicative of one or more defects identified with respect to one or more requirements associated with the code files or a portion of code in one or more of the code files, a plurality of code complexity metrics indicative of components within the code files, and a plurality of code version metrics indicative of a number of versions of the code files.

23. The method of claim 20, further comprising:
interfacing the one or more code analysis tools with a plurality of execution performance monitoring agents operable to track process execution time, subcomponent execution time, input/output resource utilization, processing resource utilization, memory resource utilization, and storage resource utilization to identify greater resource consuming trends and correlations on a per user basis.

24. The method of claim 23, further comprising:
monitoring for the trends and correlations on a time of day basis; and
adjusting the predicted code execution performance score based on one or more previously observed resource consumption patterns and a current level of resource consumption of the one or more code execution servers.

25. The method of claim 20, wherein a data warehouse system stores a plurality of records indicative of resource allocation of the one or more code execution servers and the one or more code execution metrics, and further comprising:
extracting a plurality of data feeds from the data warehouse system indicative of the code development data, personnel data, and the one or more code execution metrics, wherein the data feeds are delivered to the one or more code analysis tools.

26. The method of claim 25, further comprising:
establishing a plurality of correlations across a plurality of domains captured in the data warehouse system, the correlations comprising linking server performance with one or more of: process execution performance, code complexity, resource location, service-level agreement metrics, storage area network capacity, and license utilization; and
outputting one or more visual depictions of the correlations to an interactive dashboard interface.

27. The method of claim 20, further comprising:
adjusting one or more data values used to determine the predicted code execution performance score based on detecting an error condition associated with a component included in or used by the one or more selected files.

28. The method of claim 20, further comprising:
adjusting one or more data values used to determine the predicted code execution performance score based on detecting performance exceeding a resource utilization limit associated with a component included in or used by the one or more selected files.

29. The method of claim 20, wherein the code files are stored in a code repository using a version management system, and further comprising:
determining an updated value of the code development data responsive to a check-in operation of a new file or a new version of a file into the code repository using the version management system.

30. The method of claim 20, wherein predictively allocating one or more resources comprises adjusting one or more of a scheduled start time, an execution priority, setting a maximum processing resource threshold, setting a maximum network resource threshold, setting a maximum memory usage threshold, setting a maximum storage usage threshold, and setting a maximum execution time threshold.

* * * * *